United States Patent [19]

Schlaffke et al.

[11] Patent Number: 5,178,371
[45] Date of Patent: Jan. 12, 1993

[54] MOTOR-VEHICLE SEAT WITH A SPRING CORE RESTING ON A SUBFRAME

[75] Inventors: Hans-Jürgen Schlaffke, Saulgau; Reiner Renz, Ostelsheim; Adolf Honegg, Grafenau; Heinz Bossert, Holzgerlingen, all of Fed. Rep. of Germany

[73] Assignee: Daimler-Benz Aktiengesellschaft, Fed. Rep. of Germany

[21] Appl. No.: 371,755

[22] Filed: Jun. 27, 1989

[30] Foreign Application Priority Data

Jun. 29, 1988 [DE] Fed. Rep. of Germany ....... 3821916

[51] Int. Cl.$^5$ .......................... F16F 3/04; A47C 27/14
[52] U.S. Cl. ........................... 267/95; 5/481; 267/143
[58] Field of Search ....................... 267/83, 84, 87, 88, 267/90, 143, 144, 165, 81, 96, 105, 152, 95, 33; 297/DIG. 1, 452; 5/280, 481, 476, 478, 480, 477; 248/573, 575, 578

[56] References Cited

U.S. PATENT DOCUMENTS

| | | | |
|---|---|---|---|
| 2,925,856 | 2/1960 | Gleason | 267/84 |
| 3,069,701 | 12/1962 | McInerney | 267/143 X |
| 3,166,768 | 1/1965 | Cunningham | 267/81 X |
| 3,475,016 | 10/1969 | Wahlmann | 267/87 |
| 4,907,309 | 3/1990 | Breckle | 5/477 |

FOREIGN PATENT DOCUMENTS

| | | | |
|---|---|---|---|
| 879156 | 10/1952 | Fed. Rep. of Germany | 5/481 |
| 3442734 | 1/1986 | Fed. Rep. of Germany | |
| 2550928 | 3/1985 | France | 5/481 |
| 696349 | 8/1953 | United Kingdom | |

Primary Examiner—Robert J. Oberleitner
Attorney, Agent, or Firm—Evenson, Wands, Edwards, Lenahan & McKeown

[57] ABSTRACT

A motor-vehicle seat is disclosed with a spring core resting on a subframe and surrounded by a topframe, each topframe portion pointed in the longitudinal direction of the vehicle being supported relative to the subframe via a stay preventing floating movements and limiting lateral compression movements. In order to allow retrofitting and to prevent reactions on the topframe under compression movements the stay consists respectively of a foam block which is fixed to the subframe and which is inserted between two springs stretched from the subframe to the topframe and at least partially surrounds these positively.

4 Claims, 1 Drawing Sheet

MOTOR-VEHICLE SEAT WITH A SPRING CORE RESTING ON A SUBFRAME

BACKGROUND AND SUMMARY OF THE INVENTION

The invention relates to a motor-vehicle seat with a spring core resting on a subframe and surrounded by a top frame, each top frame portion pointed in the longitudinal direction of the vehicle being supported relative to the subframe via a stay preventing floating movements and limiting lateral compression movements.

A motor-vehicle seat of this type, in which the stay is designed respectively as a stabilizing wire, can be taken as known from German Patent Specification 3,442,734. The stablizing wire is formed as an extension of a spring turn and can therefore be produced in a simple way by mechanical means. However, it is not possible for seats without a stay to be retrofitted with the stabilizing wire. Also, the know stay affords sufficient lateral support, but relatively high forces are imparted to the top frame under the associated compression movements.

An object of the invention is to provide a stay which can easily be adapted to meet different requirements and with which even motor-vehicle seats without a stay can also be equipped subsequently, and which exerts no reaction on the top frame under compression movements taking place at the edge.

This object is achieved by means of a motor vehicle seat wherein the stay is designed as a foam block which is fixed to the frame and which is inserted between two springs stretched from the subframe to the top frame and at least partially surrounds these positively.

A simple fixing to the subframe, in interaction with the two stretched springs, is obtained if the foam block is supported on the raised edge of the subframe according to certain preferred embodiments of the invention.

The properties of the foam block which have a stabilizing effect are enhanced according to certain preferred embodiments wherein the foam block initially projects beyond the contour of the top frame, during the tensioning of the seat covering the foam block being compressed and being pressed with prestress against the stretched springs.

An even better lateral hold as a result of less compression is obtained if the top of the foam block serves as a rest for a seat spring aligned essentially in the transverse direction of the vehicle and fastened to the top frame according to certain preferred embodiments of the invention.

In a further development of preferred embodiments of the invention, it is contemplated to equip the underside and/or top of the foam block with webs projecting from this and formed on during the operation of foaming the foam block, the spring characteristic of which is such that the supporting effect of the foam block is fully utilized only at a load above that occuring during normal motoring.

A tilting movement of the webs is counteracted if these webs intersect one another with the effect of forming a wafer pattern according to certain preferred embodiments. The pattern can be regular or also irregular. Furthermore, the web height can differ over the extent of the pattern, so that depressions of differing depth are obtained next to one another.

Simple foaming moulds can be used and an easy mould-removal operation is achieved if the webs have a trapezoidal cross-section giving rise to a progressive spring characteristic and with sides tapering outwards towards one another.

Other objects, advantages and novel features of the present invention will become apparent from the following detailed description of the invention when considered in conjunction with the accompanying drawings.

DETAILED DESCRIPTION OF THE DRAWINGS

Figure 1:
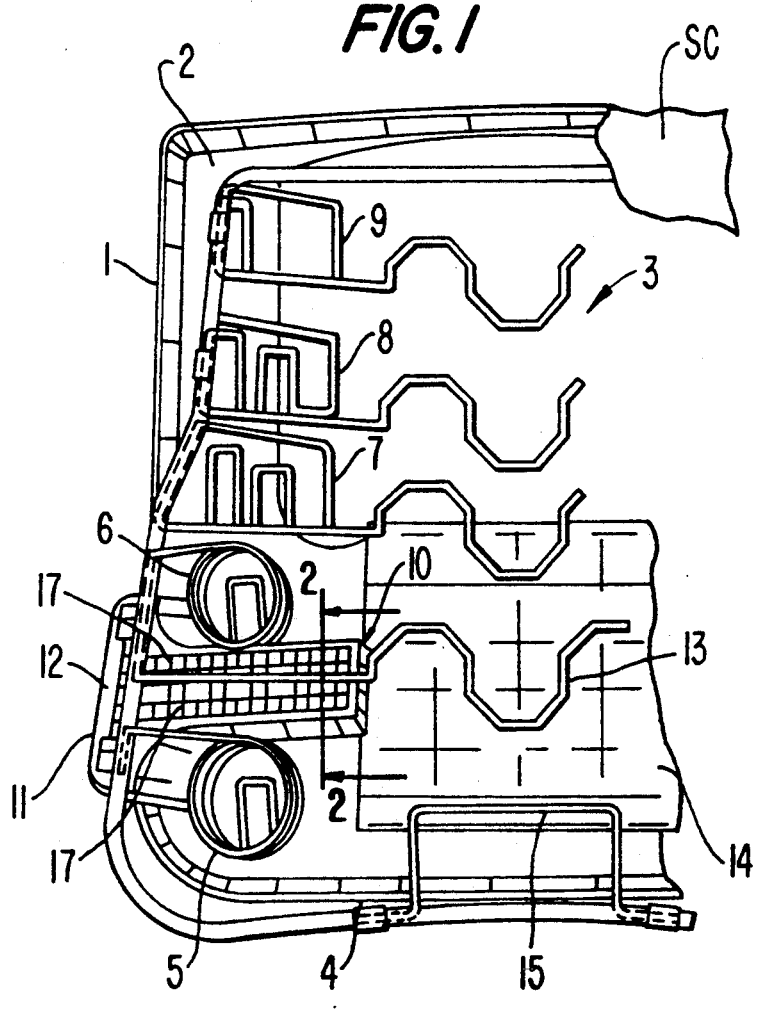
FIG. 1 shows a spring-box portion of a vehicle seat with a foam block inserted between two helical compression springs, constructed according to a preferred embodiment of the present invention.

According to FIG. 1, a motor-vehicle seat not shown in detail consists of a subframe 2 having a raised edge 1 and with a spring core 3 which is elevated above it and which is surrounded by a top frame 4. The top frame 4, in its portions which are aligned in the longitudinal direction of the vehicle and only one of which is shown, is supported on the subframe 2 via front springs 5, 6 designed as helical compression springs and via springs 7-9 adjacent to these and wound in meander form. In the drawing FIG. 1, the front of the seat is at the bottom, the left side of the seat being shown as viewed from the front.

A stay 10, which prevents not only floating movements, but also excessive lateral compression, consists of a foam block 11, the basic hardness of which can easily be adapted to meet different requirements, for example by changing the material composition and the density. The foam block 11 is inserted between the two front springs 5 and 6 and at least partially surrounds these positively, while its top 12 is supported at the top frame 4. The raised edge 1 of the subframe 2 fixes the foam block 11 in this region in interaction with the two springs 5 and 6.

As is evident from FIG. 1, the foam block 11 initially projects beyond the contour of the top frame 4 and only after the operation of tensioning the seat covering SC after the upholstering it is brought by the latter into an externally flush form generating a prestress. Under forces acting horizontally, the two foam blocks 11, only one of which is shown, prevent an excessive inclination of the two springs 5 and 6 and thus forestall the unpleasant phenomenon of floating movements.

The foam block 11 also prevent excessive lateral compression, such as can occur, for example, during cornering and when a person sits down on and gets up from the seat cushion, and in order to increase the effective supporting surface it is advantageous to extend each foam block 11 beyond the two springs 5 and 6 towards the longitudinal mid-axis of the seat and to support over a specific length on its top 12 at least one seat spring 13 aligned essentially in the transverse direction of the seat. Under local overloading of the middle region of the seat spring 13 or of a spring 15 placed in front of it, a mat 14 bridging the gap between the foam blocks 11 and fastened to the subframe 2 prevents a knocking against the subframe 2 which is associated with noise.

The foam block 11, which, contrary to the illustration in FIG. 1, can also be made wedge-shaped, is equipped on its top 12 and on its underside 16 with webs 17 which consist of the material of the foam block 11 and are formed on during the operation of foaming the foam block 11 and which intersect to provide a wafer pattern evident from FIG. 1. In addition to the pattern illustrated, a plurality of also irregular pattern designs is possible, and, as can be taken from FIG. 2, the height of the webs 17 can also vary.

To afford specific compression conditions, it is also contemplated according to certain embodiments for the webs 17 to be offset relative to one another in terms of height, so that all the webs 17 come to bear only with an increasing compression movement.

Figure 2:
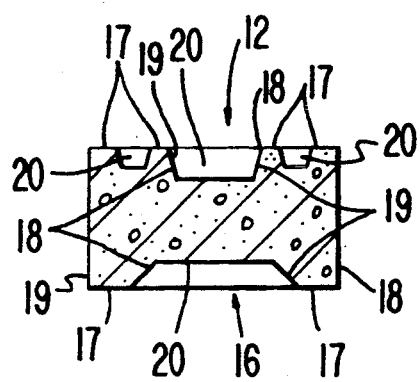
FIG. 2 shows a section along the line II—II of FIG. 1.

It is evident from FIG. 2 that the webs 17 have a trapezoidal cross-section with sides 18 and 19 tapering outwards towards one another. This, while ensuring that the foam block 11 can easily be removed from the mould, at the same time makes it possible to obtain a progressive characteristic variable within wide limits. Depressions 20 of differing depth can be delimiated from one another by means of the webs 17, the depressions 20 ensuring a reduction in volume of approximately 10% with a corresponding weight reduction.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A method of making a seat for motor vehicle passengers, comprising the steps of:

assembling a seat subframe with a seat topframe by spring means interposed therebetween, said spring means including a plurality of compression coil springs disposed along an edge of the subframe and topframe; and following said assembling step, pushing a foam block stay in from outside said edge to a position between and partly surrounding coils of two adjacent ones of said coil springs; whereby the foam block limits floating movements and lateral compression movements of a motor vehicle seat spring core resting on the subframe and surrounded by the topframe.

2. A method according to claim 1, wherein the foam block initially projects beyond a contour of the topframe and wherein the foam block is compressed and is pressed with prestress against the stretched springs during tensioning of the seat cover.

3. A method according to claim 2, further comprising a step of:

forming webs on the foam block stay.

4. A method according to claim 1, further comprising a step of:

forming webs on the foam block stay.

* * * * *